May 31, 1966     J. A. MIKINA     3,253,672

TRACTION CONTROL SYSTEM

Filed June 22, 1959     3 Sheets-Sheet 1

INVENTOR
John A. Mikina
BY
William J. Ruano
ATTORNEY

May 31, 1966     J. A. MIKINA     3,253,672

TRACTION CONTROL SYSTEM

Filed June 22, 1959     3 Sheets-Sheet 2

INVENTOR
John A. Mikina

BY
William J. Kuano
ATTORNEY

May 31, 1966  J. A. MIKINA  3,253,672
TRACTION CONTROL SYSTEM
Filed June 22, 1959  3 Sheets-Sheet 3
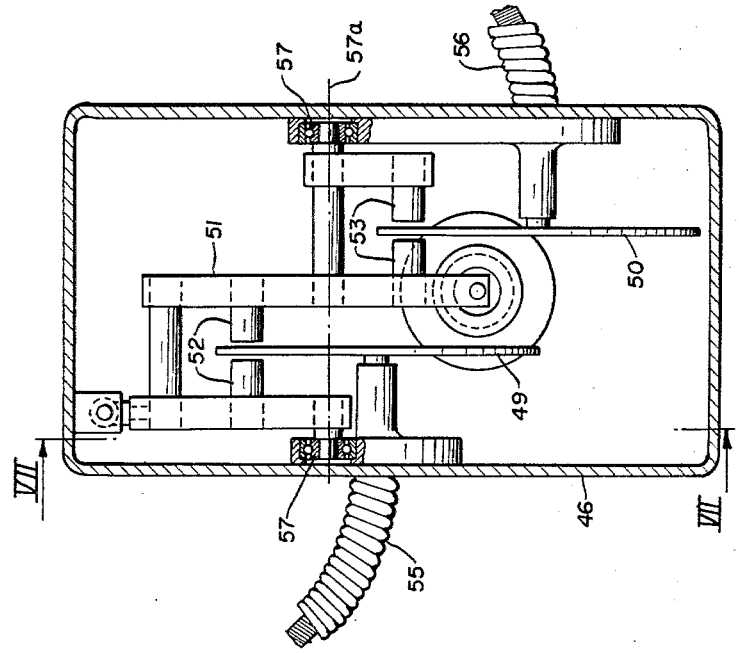
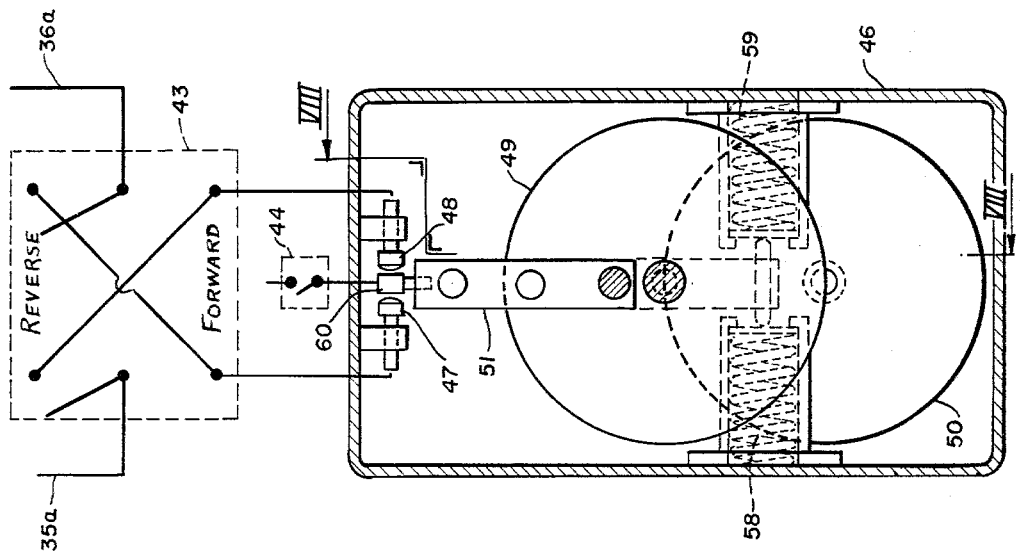
INVENTOR.
John A. Mikina
BY
William J. Ruano
ATTORNEY United States Patent Office 3,253,672
Patented May 31, 1966

3,253,672
TRACTION CONTROL SYSTEM
John A. Mikina, 17569 Whitcomb Ave., Detroit 35, Mich.
Filed June 22, 1959, Ser. No. 821,902
2 Claims. (Cl. 180—75)

This invention relates to a traction control system for automotive vehicles and, more particularly, to a system for automatically indicating which of the driving wheels is slipping and for manually or automatically applying the brake on the slipping wheel, only, to effect a brake drag in order to increase the tractive torque which can be applied to the non-slipping wheel so as to increase the total tractive effort of the vehicle.

An object of the invention is to provide novel means for manually or automatically applying the brake only on the slipping wheel and for giving a reliable visual indication of the slipping wheel.

Other objects of the invention will become apparent from a study of the following description taken with the accompanying drawing wherein:

FIG. 7 is a cross sectional view taken along line VII—VII of FIG. 8 and FIG. 8 is a cross sectional view taken along line VIII—VIII of FIG. 7 showing, partly schematically, a modification of the automatic indicating and brake-applying system illustrated in FIGS. 4 and 5.

It is common practice in automotive drive systems to transmit torque by means of a differential gear system to vehicle drive wheels which are separated from each other by an appreciable distance, such as the width of the vehicle. The gear differential permits such drive wheels to exert a substantially uniform tractive effort at each wheel and at the same time to roll at different speeds, as required, if the vehicle is to travel on a curve or turn a corner without abrasive slipping of the tires on the road. The need for a gear differential was recognized from the earliest days of automotive development, and this mechanism has been and continues to be an indispensable component of all vehicles whose two or more drive wheels are separated far enough to produce or demand differential wheel speeds on the vehicle trajectory.

A great disadvantage of the differential gear drive, and one which has been experienced by several generations of motorists, is that it imposes a limitation on the tractive effort of the drive wheels to a value substantially no greater than twice the tractive effort produced at the wheel having the least tractive effort. Ordinarily, this limitation is of no consequence, since the coefficient of friction between each drive wheel and the road is substantially equal and high enough for adequate traction.

However, under certain adverse conditions of driving, such as on rain, mud, snow or ice-covered roads, it frequently happens that one drive wheeel only is over a patch or section of slippery road having a low coefficient of friction while the other drive wheel is over an area having a higher coefficient of friction. Under such conditions, the tractive effort of each drive wheel is limited to that capable of being exerted by the drive wheel on the slippery area with the least traction. If this tractive effort is insufficient to move the vehicle against its impedimenta to motion or up a grade, and if the driver increases his engine speed in an effort to move the vehicle, the familiar result is that the wheel with the least traction will spin and its tractive effort will drop even further if the dynamic coefficient of friction becomes less than the initially static coefficient. Under these circumstances the motorist, if left to his own resources, must perforce increase the effective tractive friction at his drive wheels either by scattering sand or cinders under the wheels or by undertaking the arduous task of putting chains on the drive wheels.

Over the years, this problem of increasing the tractive effort of the differential drive system to approach or equal that capable of being exerted by the wheel with the greatest traction, has challenged the ingenuity of inventors and has resisted efforts at a successful solution. The nearest approach to a partially successful attack on the problem has been made by the proponents of the so-called limited-slip differential.

Figure 1:
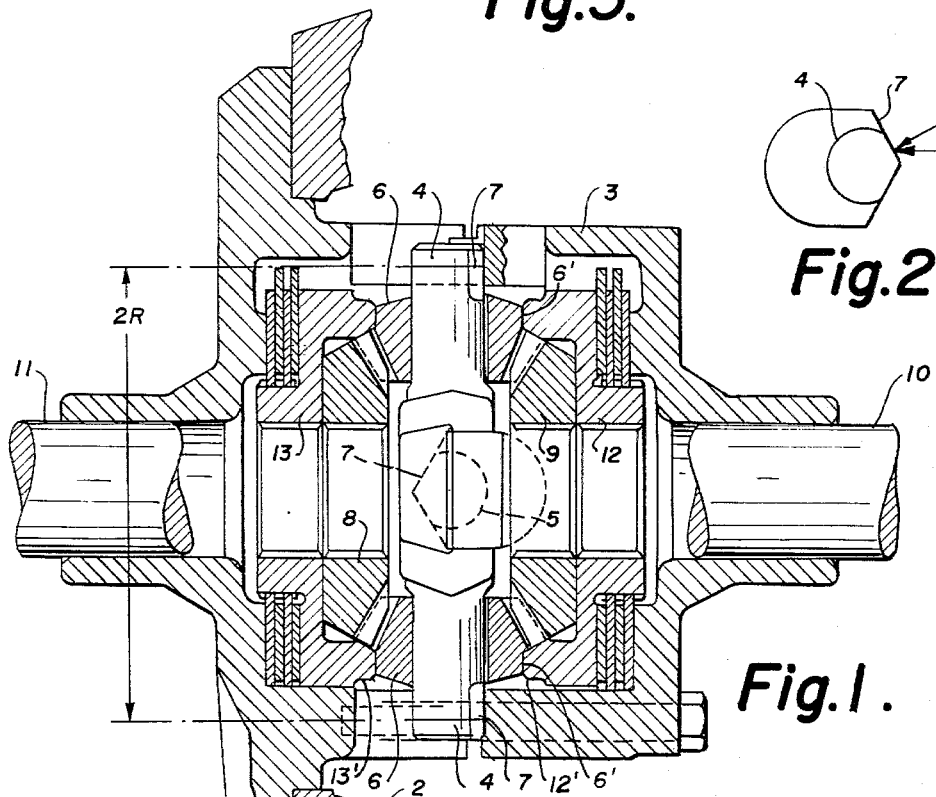
FIG. 1 is a transverse cross-sectional view of a conventional differential for automobiles.

The best known of these, and one which is currently in use, is schematically illustrated in FIG. 1. Its functioning will be described in considerable detail, in order to expose its serious deficiencies and to explain how my invention results in a drive system employing a conventional differential and having all of the necessary advantages but none of the disadvantages of the limited-slip differential.

Referring to FIG. 1, the output torque of the engine transmission is applied to the differential carrier 3 by means of the drive pinion 1 and ring gear 2. The torque of carrier 3 is conveyed to each drive axle and wheel by two paths. One part of the carrier torque is transmitted to each axle by means of the differential bevel pinions and side gears, as in the conventional differential. The other part of the carrier torque is transmitted to each side axle through friction clutches, shown here as of the multiple-disc variety. The division of torque between the side gears and the disc clutches is determined by the coefficient of friction between the clutch discs and by the system geometry, which includes such factors as the size and number of clutch discs and the magnitude of certain ramp or cam angles.

The portion of the torque of carrier 3 that goes to the differential side gears is transmitted first to the pair of cross-pins 4 and 5 which intersect at 90° and carry the four differential bevel pinions 6. Both ends of these cross-pins engage a ramp or cam surface on carrier 3 by means of matching flats 7 on the pins. The flats and engaging ramps of cross-pin 5 are the mirror images of the flats and engaging ramps on cross-pin 4.

The ramp surface bearing against each end of each cross-pin causes the cross-pins to move with the carrier 3 and to apply equal tooth loads to side gears 8 and 9 through the intermediary of the differential pinions 6, which are freely pivoted on their supporting cross-pins 4 and 5.

Figure 2:
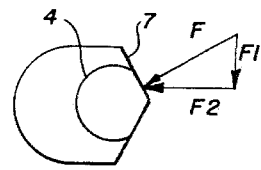
FIG. 2 is a diagram showing forces applied to a part of the differential.

As the axle shafts 10 and 11 twist and develop a resisting torque, a force F (see FIG. 2) appears between one ramp face and one engaging flat at each end of each cross-pin. This force has a component $F_1$ which, when multiplied by the distance 2R between the flats on a given cross-pin, represents the part of the carrier 3 torque which is transmitted to the side gears 8 and 9 by the two bevel pinions 6 on that cross-pin.

The axial component $F_2$ of the substantially normal force F on a cross-pin flat causes a force equal to $F_2$ to be applied to members 12 and 13 which are splined to axle shafts 10 and 11 respectively. A force $F_2$ is applied to members 12 and 13 at each end of each cross-pin 4 and 5 through the intermediary of the hubs $6^1$ on differential pinions 6, which can roll on the projecting circular tracks $12^1$ and $13^1$ on members 12 and 13. Cross-pin 4 applies a total axial force $2F_2$ to clutch member 13, while cross-pin 5 applies a substantially equal force to clutch member 12.

Insofar as torque transmission to the side gears 8 and 9 is concerned, one cross-pin and its two bevel pinions (either 4 or 5) are normally redundant. The angular deflections of each cross-pin within carrier 3 due to cross-pin bending flexibility and flat-on-ramp travel due to clutch disc stack flexibility combine to insure a substantially equal division of the side gear torque between the two cross-pins.

Members 12 and 13 carry a plurality of clutch discs which are splined to the hubs of 12 and 13 and are interleaved between a plurality of other clutch discs which are splined to carrier 3. Thus the axial force $2F_2$ on member 13, for example, compresses the clutch discs together and allows the clutch to transmit a part of the available carrier torque to axle 11.

In order that the limited-slip differential of FIG. 1 may exhibit an appreciable advantage over a conventional differential under the adverse driving conditions posed by one wheel having a low traction coefficient, the disc clutches must have a slip torque which is of the same order of magnitude as the torque transmitted through the side gears. For typical proportions of ramp angles and disc dimensions and number, each disc clutch can transmit (or will slip at) a torque equal to about $\frac{2}{3}$ of the torque transmitted by one side gear.

Using this factor of $\frac{2}{3}$, the tractive advantage of the limited-slip differential may be readily calculated. For example, assume that the slipping wheel torque on axle 11 is equal to $t$. If the angular velocity of carrier 3 is $w$, the angular velocity of axle 11 is $w+\Delta w'$, while that of the non-slipping axle 10 is $w-\Delta w$. (When the non-slipping axle is stationary, $w-\Delta w=0$ and $w+\Delta w=2w$. The slip torque $t$ of axle 11 must be supplied entirely by gear 8 since carrier 3 is moving more slowly than axle 11 and cannot supply any driving torque through the disc clutch on axle 11. On the contrary, because axle 11 and its clutch member 13 are moving faster than carrier 3, the slip torque of this clutch member must also be supplied by side gear 8. Thus the relations $$T_{13} = \tfrac{2}{3} T_8 \qquad (1)$$

Hence
$$t + T_{13} = T_8 \qquad (2)$$

$$T_8 = 3t \qquad (3)$$

$$T_{13} = 2t$$

where $T_{13}=$ slip torque of clutch member 13
$T_8=$ torque of side gear 8
$t=$ slip torque of wheel on axle shaft 11.

If the torque of side gear 8 is $3t$, this must also be the torque of side gear 9 on the non-slipping axle 10, by virtue of the equality of tooth loads on the bevel pinions 6. The torque relations for this side of the differential carrier are thus $$T_{12} = \tfrac{2}{3} T_9 = 2t \qquad (4)$$

where $T_{12}=$ slip torque of clutch member 12; $T_9=$ torque of side gear 9. In this case, however, the differential carrier is moving with a higher angular velocity than axle 10. Hence, the disc clutch 12 aids the side gear 9 in driving axle 10. Thus, the total torque transmitted to the non-slipping axle 10 is $3t+2t=5t$, or 5 times the torque of the slipping wheel. The total tractive effort on the vehicle is thus proportional to $t+5t$ or $6t$.

In the case of a conventional differential on the other hand, the total tractive effort is proportional to $2t$. The limited-slip differential of FIG. 1 thus shows a 3:1 advantage over the conventional differential under the adverse driving conditions created by one slipping wheel. So far so good. This is a very worthwhile advantage.

However, consideration will now be given to the performance of the limited-slip differential under the more usual condition of driving on a curve with an undiminished coefficient of friction between each drive wheel and the road. Let the car tractive effort just before entering the curve be represented by a torque $T$ on each drive axle (10 and 11), so that the total tractive effort required to propel the vehicle at the given speed is proportional to $2T$.

When the vehicle enters a curve in the road, the drive wheel on the outside of the curve will roll with a higher angular velocity while the inner wheel will roll with a lower angular velocity than the angular velocity of the ring gear and differential carrier 3. The initial tractive effort $T$ on each drive axle will therefore undergo a change. Let the torque of axle 11 on the outer wheel be $T_0$. This torque must be supplied entirely by side gear 8, since axle 11 is moving faster than the differential carrier 3. Moreover, side gear 8 must also supply the torque required to slip clutch member 13, which is moving at axle 11 speed. The ratio between clutch torque and side gear torque being $\frac{2}{3}$ under all conditions in this example, results in the following relations:

$$T_{13} = \tfrac{2}{3} T_8 \qquad (5)$$

Hence
$$T_0 + T_{13} = T_8 \qquad (6)$$

$$T_8 = 3T_0 \qquad (7)$$

$$T_{13} = 2T_0$$

If the torque of side gear 8 is $3T$, this must also be the torque of side gear 9 on the inner slower running axle 10, by virtue of the equality of tooth loads on the bevel pinions 6. The torque relations for the side gear 9 and clucth 12 are therefore $$T_{12} = \tfrac{2}{3} T_9 = 2T_0 \qquad (8)$$

Since the differential carrier is moving with a higher angular velocity than axle 10, clutch member 12 aids side gear 9 in driving axle 10, and the total torque on axle 10 is therefore $3T_0 + 2T_0 = 5T_0$.

Now, assume that the curve is so gradual that no decrease in speed is required upon entering it. (Or, the road is adequately banked.) In that case, the required tractive effort is still represented by $2T$. Hence the sum of the axle torques:

$$T_0 + 5T_0 = 2T \qquad (9)$$

From which
$$T_0 = 1/3\,T \text{ (outer wheel torque)} \qquad (10)$$

and
$$5T_0 = 1\tfrac{2}{3} T \text{ (inner wheel torque)} \qquad (11)$$

Thus is obtained the interesting result that upon entering a curve, no matter how slight, the initial equal tractive effort at each drive wheel suddenly changes to a condition in which the outer faster moving wheel supplies only $\frac{1}{6}$ of the total tractive effort, while the inner wheel is called upon to deliver $\frac{5}{6}$ of the total tractive effort. The inner, slower moving, axle 10 experiences a $66\frac{2}{3}\%$ increase in its torque, which in the long run will appreciably reduce its fatigue life.

A difference in axle speeds will be the rule rather than the exception in normal driving, either due to (1) a curvature of the road or (2) a curved trajectory as in pulling out and passing another vehicle or (3) due to one drive tire being larger or smaller than the other one due to wear or to a different degree of inflation. Thus it may be expected that the above calculated torque and traction disparity between the slower and the faster running axle will be a nearly ever present occurrence, and the resultant reduction in axle fatigue life due to overloading will be a real danger.

Another aspect of the consequences of the use of the limited-slip differential has to do with the stability of the car on snow or ice-covered roads. Assume that the driver is driving cautiously along a straight portion of the road, with just enough drive torque applied to the wheels to prevent their slipping. If, under conditions of a perfect speed match the drive torque is evenly divided between the two drive wheels, then upon entering a curve, no matter how slight, the drive torque on the slower running wheel will suddenly jump to 1⅔ of its initial value. Since it is assumed that the initial value on the straight part of the road was just below the wheel slip point, it may be expected that the sudden increase in inner wheel torque will cause this wheel to spin on the snow or ice. Thereupon, in accordance with the purpose of the limited-spin differential, the torque on the other or non-slipping wheel will suddenly increase to 5 times the slipping wheel torque and it too will begin to slip. The development of a wheel spin in both drive wheels on a slippery curve could lead to a dangerous skid of the vehicle.

Yet another disadvantage of the limited-slip differential appears with regard to its effect on car steering. Bearing in mind that the tractive effort of the inner or slower turning wheel is always 5 times that of the outer faster turning one, we see that the reaction force on the car axle housing due to the increased inner wheel torque exerts a moment on the car in a direction to oppose the initial steering action which gave rise to the increased inner wheel torque. This rear wheel opposition to the front wheel steering action could be particularly dangerous in high speed pull-outs and passing of other vehicles.

The foregoing analysis of the advantages and disadvantages of the limited-slip differential serves as an introduction to my invention, an object of which consists primarily of providing a means for causing a drive system equipped with a conventional full-slip differential to have all of the tractive advantages which we have demonstrated that a limited-slip differential possesses, but none of its disadvantages.

I propose that the existing brake system on the drive wheels be used in a particular selective way to control the tractive effort developed at the drive wheels. Consider what can be accomplished in this way in the first cited case of a car with one drive wheel on a slippery area while the other is standing on an area with a higher coefficient of tractive friction. I propose that a wheel brake, such as the car emergency brake, be applied to the slipping wheel only in order to increase the tractive torque which can be applied to the non-slipping wheel.

Let this brake torque be $T_b$, while the slip wheel torque is $t$. The axle torque of this wheel is thus $t+T_b$, and is equal, by full differential action, to the torque which is applied to the non-slipping axle. If the non-slipping wheel has sufficient road friction to absorb this torque, the total tractive effort on the vehicle becomes $t+t+T_b$. Thus if, as can be readily done, the brake torque $T_b$ is made equal to $4t$, there is attained a total tractive effort equivalent to what can be produced with the limited-slip differential under these conditions.

The presence of the brake drag on the slipping wheel does not detract in any way from the net tractive effort calculated above, since the slipping wheel is turning with a greater angular velocity than the ring gear and differential carrier. Since the non-slipping wheel must then have a lower angular velocity than the ring gear and a differential carrier, it can be concluded that the torque required to overcome the brake torque on the slipping wheel must be supplied by its associated side gear within the differential carrier. I thus have achieved the completely novel result of increasing the net tractive effort of the vehicle by applying only a wheel braking torque to the slipping and ineffective wheel only.

With regard to a practical embodiment of the basic idea, there are two modifications possible within the scope and spirit of the invention: in one, the selective wheel braking is manually controlled; in the other, it is automatically controlled in response to the difference in speed between the drive wheels.

Figure 3:
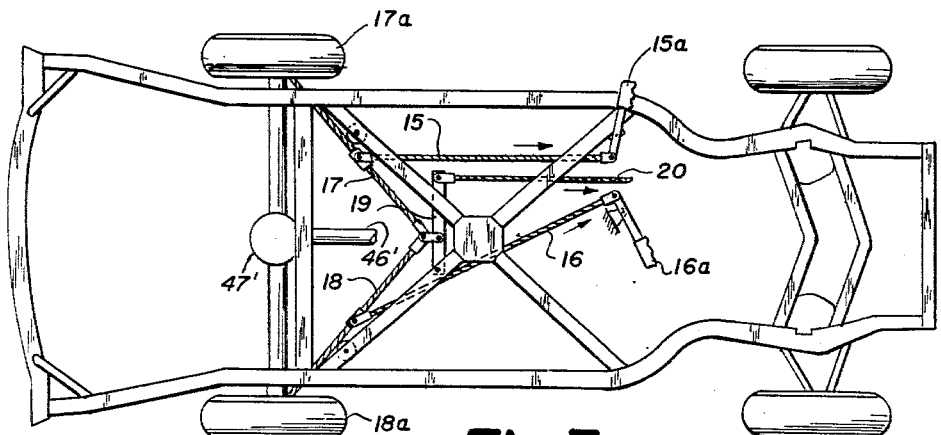
FIG. 3 is a top or plan view of a vehicle brake system equipped with a manually controlled embodiment of the present invention.

In the manually controlled embodiment of FIG. 3, showing drive shaft 46' and differential 47', I propose that auxiliary cables 15 and 16 be attached to each emergency cable 17 and 18 between their tie point 19 and the drive wheels 17a and 18a. The existing emergency cable 20 extends from tie point 19 to the driver's location where it terminates in the emergency brake hand lever or foot pedal. The auxiliary cables 15 and 16 are also brought into the driver's location and terminate in actuating hand levers or foot pedals 15a and 16a one for each cable. The left actuator may be labelled as "Left Anti-Spin" and the other the "Right Anti-Spin."

In use, when the driver becomes aware of one wheel spinning and the consequent loss of traction as he attempts to go up a slippery grade, he moves one or the other of the anti-spin actuators until the car begins to move due to the tractive effort of the unbraked non-spinning wheel. If the driver cannot readily determine from his position which drive wheel is spinning, it will suffice for him to momentarily move each anti-spin actuator in turn until traction is reestablished when the spinning wheel is braked.

Figure 4:
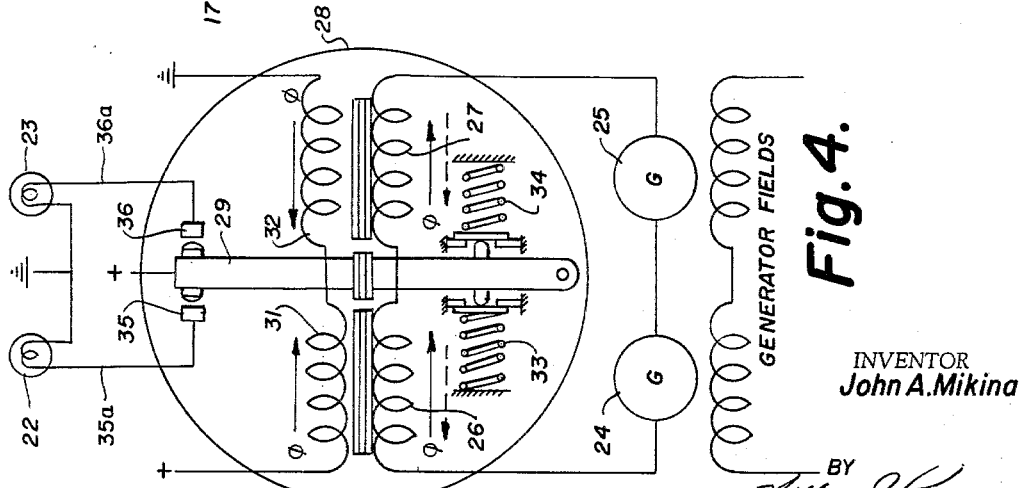
FIG. 4 is a schematic or circuit diagram of an automatically controlled embodiment of the invention including visual indicating means.

Additionally, indicator lights 22, 23, as shown in FIG. 4, can be provided over the anti-spin actuators and connected to the electric circuit according to which wheel is spinning. The spin sensor on each drive wheel is a D.C. generator 24, 25 driven by the wheel and with generator outputs connected serially opposed so as to produce a net output voltage proportional to the wheel speed difference and of a polarity determined by which wheel is rotating faster, as shown in FIG. 4.

The net output voltage of the series generators is applied to a pair of series coils 26, 27 on the indicator light relay 28. These coils are on opposite sides of the relay armature 29, and produce a magnetic flux in the same direction, as indicated by the arrows. Another pair of series opposing coils 31, 32 on the relay field is connected to the vehicle battery circuit. They produce a magnetic field which reinforces that of coil 26 or 27 and opposes that of the other generator energized coil.

The relay armature 29 is between a pair of set-up springs 33, 34 which rest against stationary seats and almost touching armature 29. When the armature 29 is displaced, it must overcome the set-up force of either spring 33 or 34 before it can close its control contacts 35 and 36 which operate the anti-spin actuator indicator lights.

When both drive wheels are rotating at substantially the same speed, the relay coils 26, 27, 31 and 32 produce a flux and force which is small and insufficient to overcome the set-up force of springs 33 or 34, and the relay armature is at rest. However, when one drive wheel exceeds the speed of the other by a predetermined amount, indicating wheel slip, its associated generator, say 24 will produce a higher voltage than the other generator. The polarity of the net output voltage will then be such as to cause a current flow through coils 26 and 27 which reinforces the flux due to coil 31 and reduces the flux due to coil 32. The relay armature 29 is thus pulled over towards coils 26 and 31 and closes contact 35 which lights the indicator light over the "Left Anti-Spin" actuator in order to signal the driver to apply a brake torque to the wheel which drives generator 24 and which is spinning. A spin of the other drive wheel and its associated generator 25 in excess of the speed of generator 24 will similarly signal the driver to brake that wheel by means of relay contact 36.

In this selective braking system, I employ auxiliary cables 15, 16 on the emergency brake system and leading to the anti-spin actuators. The original emergency cable 20 from tie point 19 to the driver's location is left undisturbed so as to allow normal use of the emergency brake system.

Although I have described the functioning of the selective drive wheel braking system as it is applied to the auxiliary or emergency brake system of the vehicle, I do not restrict myself entirely to use of the emergency system but also envision the possibility of using the service hydraulic, mechanical, or air brake system of the vehicle for such selective drive wheel braking. I prefer, however, to add the selective braking feature to the auxiliary or emergency brake system so as to leave undisturbed the functioning and the reliability of the mechanical, hydraulic, or air actuated service brakes of the vehicle.

Figure 5:
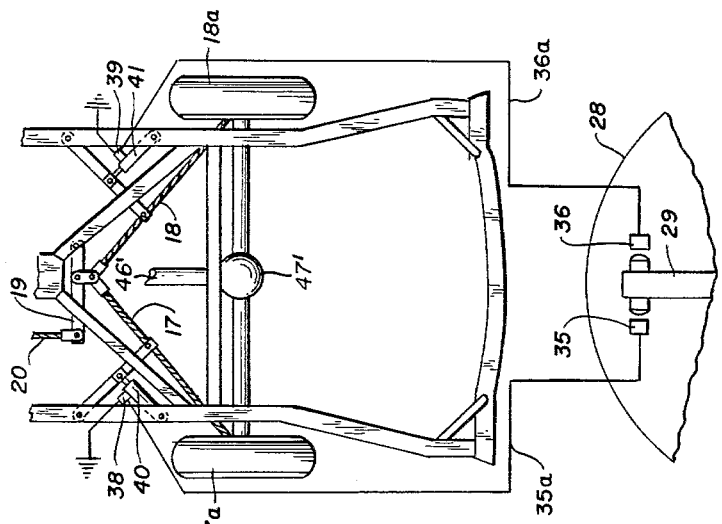
FIG. 5 shows how the automatic system illustrated in FIG. 4 automatically applies the brake of the spinning wheel of a vehicle.

FIG. 5 shows the other embodiment, within the scope and spirit of my invention, which is a system of automatically controlled separate and individual braking of the vehicle drive wheels in response to wheel spin signals. Such wheels 17a and 18a are driven by drive shaft 46 through differential 47. The previously described spin indicator system consisting of speed sensing generators 24 and 25 and relay 28, shown in FIG. 4, can here be used to advantage and included in the system shown in FIG. 5 for obtaining automatic braking of the spinning low traction wheel.

Since differences in drive wheel speed will normally occur when the vehicle is on a curve or making a turn, it is necessary to design the wheel speed sensing system as to differentiate between the normal wheel speed differences occurring on a curve and the wheel speed difference that signifies an excessive wheel spin due to a loss of traction.

In order to determine what maximum normal drive wheel speed difference will occur on a curve, consider a typical passenger car having a 42 ft. diameter turning circle, and assume that the maximum centripetal acceleration in such a turn will be ⅓ of gravity. In that case $$\frac{V^2}{21} = \frac{1}{3} \times 32.2 \text{ ft./sec.}^2$$

from which $V=15$ ft./sec. If the wheel tread is 5 ft., the difference in wheel speeds on this turning circle for 2½ ft. diameter wheels is $$\Delta w = \frac{15 \times 5}{\pi \times 2} \frac{1}{2} \times 21 = .45 \text{ r.p.s.} = 27 \text{ r.p.m.}$$

Where $\Delta w =$ differential speed. Therefore, if relay 28 is designed so as to be insensitive to any generator net output voltage corresponding to less than, say 30 r.p.m. difference in drive wheel speed, the difference in speeds in excess of 30 r.p.m can be used for automatic control of selective drive wheel braking of a wheel spinning due to low traction. The lower speed limit of 30 r.p.m is rather low, corresponding to 2.67 miles per hour, and a tractionless spinning wheel will easily exceed this value as the driver strives desperately to get his car moving.

The control relay 28 can be designed to respond only to a net generator output voltage in excess of a certain limiting voltage of either polarity by biasing armature 29 on each side with set-up springs 33 and 34. These springs do not normally bear against armature 29 but rest on seats adjacent thereto, and are lifted off these seats by the magnetic pull of the relay magnets on the armature when the net generator output voltage produces a magnet pull in excess of the set up force of either spring 33 or 34.

Relay contacts 35 and 36 are used to energize either one of two solenoid coils 38 and 39 which control the air, hydraulic, or vacuum cylinders 40 and 41 respectively. These cylinders are connected to the emergency brake cables as shown in FIG. 5 and apply the emergency brake to the drive wheel whose connected speed sensing generator is going faster whenever the speed difference between the drive wheels exceeds 30 r.p.m. or any other predetermined speed. The air, hydraulic, or vacuum cylinders may be of such a size that the resultant brake torque applied to the spinning wheel is of the order of 4 or 5 times the slip traction torque of the spinning wheel, which should be sufficient to move the anxious motorist from his slippery impasse.

The relay coils 26 and 27 are in series so as to deactivate the automatic braking system and prevent application of individual wheel brakes upon an open circuit in the generator system or due to a generator fault. For the same reason, the field coils of the generators are also connected in series, as well as the biasing coils 31 and 32 of voltage sensitive relay 28.

To illustrate the basic principles of my invention, I have shown the indicator circuit of FIG. 4 and the automatic control circuit of FIG. 5 as they would be applied to forward motion only of the vehicle. Although this regime of operation is by far the most important one, there are occasions when control of vehicle traction is also required for reverse motion of the vehicle. It will now go one step further and show how to take into account for reverse motion the reversal of the tachometer generator output polarity and the consequent reversal of current through relay coils 26 and 27.

Figure 6:
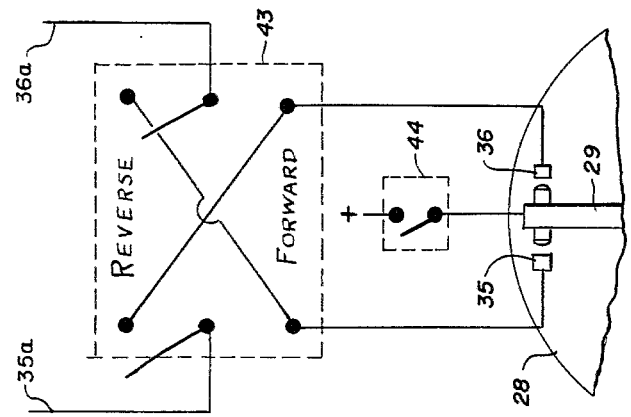
FIG. 6 shows a modification of the circuit illustrated in FIGS. 4 and 5.

For example, if in forward motion the wheel that drives generator 24 is slipping, the polarity of the net output voltage will be such that current will flow through coils 26 and 27 in the direction to reinforce the magnetic flux of coil 31 and reduce that of coil 32. This will cause the relay armature to close contact 35 and either light the indicator light 22 to signal the driver to brake wheel and generator 24, or automatically apply a brake to wheel and associated generator 24, as shown in FIG. 5. However, if the transmission is thrown into reverse and if the same wheel and associated generator 24 slip, the reversal of output polarity and the consequent reversal of current through relay coils 26 and 27 will cause relay 28 to close contact 36 instead. Hence, to obtain the proper light indication or automatic brake application for reverse motion of the vehicle, the output leads from relay contacts 35 and 36 must be connected to the indicator lights 22, 23 or the control valve solenoids 38, 39 through a double-pole double-throw reversing switch 43, as shown in FIG. 6. This switch may be operated automatically by being interlocked with the driver's reverse shift lever.

Alternatively, substantially the same effect would be produced by a reversing switch in the connection of relay coils 26 and 27 to the tachometer generators 24, 25 or in the connection of coils 31 and 32 to the vehicle battery, or in the connection of the tachometer generator fields to the vehicle battery. However, I prefer to make the reversal in the relay output circuit, to avoid the changes in calibration of the spin sensing generator and relay circuit which might result from the presence of moving contacts in this circuit or from a reversal of the generator fields.

In use, the automatic individual drive wheel braking system will function as follows. If the motorist, for example, is attempting to drive up a grade and the left drive wheel begins to spin on the slippery crown of the road, when the slip speed exceeds say 30 r.p.m. the left air, hydraulic, or vacuum cylinder will apply the emergency brake to the spinning wheel. This will allow the right wheel to develop a tractive effort up to the limit of the left brake to provide the necessary reaction for the driving side gear within the differential carrier.

If the driver increases his engine torque and attempts to go faster under these conditions, the right wheel will begin to slip if its axle torque is in excess of what the wheel friction with the ground can support or equilibrate. Thereupon, the left wheel will stop spinning, since the brake torque on it will then be in excess of the available side gear torque, as determined by the right wheel slip torque. When the right wheel spin becomes greater than 30 r.p.m., the right wheel brake is automatically applied and the tractive effort is transferred back to the now non-spinning left wheel. Thus, this alternate transfer of tractive effort from one wheel to the other and back again, and of an amount in excess of the tractive effort produced by the spinning wheel, will enable the driver to "walk" his car in effect up the slippery grade. A wheel spin, whenever begun, is not allowed to continue futilely but results in a transfer of a substantial tractive effort to the non-spining wheel.

When driving on dry roads, on the other hand, the difference in speed between the drive wheels always remains below the speed at which the selective braking system is actuated, and the usual equal division of load between the drive axles is realized through the unimpeded functioning of the conventional differential drive. Thus, the tendency to skid on curves or on slippery roads is avoided, and no opposition to steering is experienced, as was found to be the case with the limited-slip differential.

The foregoing description of my traction control system is complete insofar as it pertains to vehicle driving traction only for either forward or reverse motion of the vehicle. I now wish to derive a further requirement which the automatic traction control system must satisfy for vehicle stability during the operating regime involving the braking of the vehicle by the normal application of its service brakes by the driver.

A fundamental requirement for vehicle stability during braking on a slippery road having a reduced coefficient of wheel friction is that at least one front wheel and one rear wheel, but preferably all wheels, remain turning and not locked and skidding. For example, if both front wheels are locked by the service brakes and simply skid over the road, the wheels then cannot exert any steering or guiding forces on the vehicle. Similarly, if both rear wheels are locked by the service brakes, their ability to provide lateral guiding forces is lost or seriously impaired and the vehicle can skid sidewise under very slight lateral forces such as the gravity component on the slope of the road away from its crown. The loss of steering or laterally restraining forces by a slipping wheel simply comes about from the appreciable reduction of its coefficient of friction with the road under the dynamic conditions of lubricated sliding.

In adding the automatically applied traction control system to a vehicle, which functions by selective braking of the driving wheels only, care must be taken that the automatic application of the axuliary brakes, in addition to the service brakes of the vehicle, does not create conditions favorable to the locking of both driving wheels and the development of a lateral skid. For example, a situation could arise where a careful, experienced driver on a snow or ice-covered road attempts to slow down his car by the application of his service brakes. He does so gently in order to avoid locking his wheels. However, since the wheel brakes are not all perfectly uniform as regards lining friction and the coefficient of friction between each wheel and the road is not equal, it cauld easily happen that one drive wheel could be locked momentarily. If the vehicle traction control system of FIGS. 5 and 6 were then operative, the output voltage of the tachometer generator driven by the locked wheel, say 24, would instantly drop to zero and the output voltage of the still turning wheel and generator 25 would cause relay 28 to close contact 36 signalling for the application of the traction control auxiliary brake to wheel and generator 25. The automatic application of the auxiliary brake would thereupon cause the wheel associated with generator 25 to be locked also under the prevailing low traction conditions, and thus both driving wheels would be locked.

Of course the auxiliary brake application would be only of transient duration, since when both wheels are locked their tachometer generator output voltages will go to zero, thus causing the contacts of relay 28 to open and to release the auxiliary brake on wheel and generator 25. However, in the presence of an already applied service brake, even a momentary application of the auxiliary brake could induce a locked-wheel condition which would then be maintained steadily by the service brake during its time of application.

In order to avoid such a situation, I simply provide a normally-closed single-pole switch 44 in the ungrounded positive battery lead leading up to the center control contact of relay 28 as shown in FIG. 6. This switch is interlocked with the service brake pedal so as to open the circuit upon any application of the service brakes, thus deactivating the automatic traction control system. Obviously, when the driver is applying his service brakes, he has no need for driving traction control on his vehicle. Switch 44 may either be a hydraulic diaphragm-actuated one similar to the stop-light switch in existing hydraulic service brake systems, or it may be one mechanically operated by the initial take-up motion of the brake pedal.

In another embodiment of my invention, FIGS. 7 and 8, I effect a great simplification of the traction control system by replacing the speed sensing generators 24 and 25 and the control relay 28 by a governing relay 46 which responds directly to wheel differential speed and whose control contacts 47 and 48 direct the flow of current to the solenoid valves 38 and 39 on the auxiliary brake cylinders 40 and 41.

As shown in FIGS. 7 and 8, governing relay 46 is actuated by electromagnetic drag forces developed between a pair of metal discs 49 and 50 and a pivoted magnet structure 51. The magnet structure consists of pairs of permanent magnets 52 and 53 (such as Alnico) which form a magnetic field in the air gap in which each metal disc rotates. These discs are preferably made of copper or aluminum, and are rotated by means of flexible shaft drives 55 and 56 which are coupled by means of pinions or friction wheels to the hubs of the driving wheels of the vehicle.

The magnet structure is pivoted on bearings 57, and the spinning discs and magnets are so positioned relative to the pivot axis 57a that they create opposing torques about this axis when the vehicle drive wheels and connected discs 49, 50 rotate both in the same direction, as is the case during either forward or reverse motion of the vehicle. When both wheels and discs spin at the same speed, the magnetic drag torques about axis 57a are balanced. If the right wheel, for example, begins to slip relative to the left one, the drag torque of disc 50 on magnets 53 will become greater than that of the opposing torque due to disc 49 and magnets 52. When the right wheel slip speed exceeds a predetermined amount, the unbalanced drag torque on 51 becomes large enough to overcome the torque of set-up spring 58 and 51 will rotate on its pivot axis, causing contact 60 to engage stationary contact 48, causing solenoid valve 39 to become energized and to initiate the application of the auxiliary vehicle brake to the right drive wheel to impede its slip velocity.

Similarly, if the left wheel slip begins to exceed a predetermined value, indicating a condition of low traction, drag disc 49 acting on magnets 52 will produce a drag torque sufficiently greater than the opposing drag torque of disc 50 and magnets 53 to overcome the set-up force of spring 59 and cause contact 47 to close the circuit of solenoid valve 38 causing the auxiliary brake to be applied to the left wheel in order to increase the tractive effort which can be developed by the right drive wheel.

As before, a double-pole double-throw switch 43 is provided and interlocked with the transmission gear selection lever, in order to reverse the relay connections to the wheel brake solenoids when the car motion is reversed. Also, the normally-closed switch 44 is put in the ungrounded lead to relay terminal 60 in order to deactivate the traction control brake system when the foot-operated service brakes are being applied.

As in relay 28 the function of the set-up springs 58 and 59 is to establish a lower limit of differential wheel speeds, below which the governing relay 46 is inoperative. The bias torque of springs 58 and 59 is chosen so as to permit the vehicle ot acquire differential wheel speeds in a curve or when turning a corner without activating the traction control system.

The pivoted magnet and contact assembly of governing relay 46 has its center of gravity on the pivot axis in order to eliminate any effect of inertia or vibration forces on the control contacts. This balance need not be too precise however since armature 51 is normally maintained in position between set-up springs 58 and 59.

Thus it will be seen that I have provided an efficient and reliable automotive system which is automatically responsive to traction wheel speeds to detect which of the traction wheels is slipping relative to the other, also to automatically apply the brake only on the slipping, low traction wheel without braking the other wheel whereby the overall traction of the vehicle is greatly increased; furthermore, I have provided an automotive traction control system which is relatively inexpensive and which may be applied as an accessory to automotive vehicles of conventional construction, that is, having conventional differentials as distinguished from complicated differentials of special construction such as used in the past in an attempt to solve the problem of loss of traction because of slipping of a traction wheel.

While I have illustrated and described several embodiments of my invention, it will be understood that these are by way of illustration only, and that various changes and modifications may be made within the contemplation of my invention and within the scope of the following claims.

I claim:

1. In an automotive vehicle having a drive shaft, traction wheels and a differential connecting said drive shaft with said traction wheels for providing the latter with differential speeds of rotation, a brake individual to and cooperating with each of said wheels, actuating means for each said wheel brake and connected thereto for energizing said brakes, means connected to said last mentioned means for simultaneously operating said actuating means and thereby simultaneously energizing the brakes, an electromagnetic differential relay connected to said traction wheels so as to respond directly to their differential speed, electrical control contacts operated by said relay, and electrical brake operating means controlled by said control contacts and connected individually to each of said actuating means for selectively operating each said actuating means and thereby energizing its associated wheel brake individually so as to apply braking effort only to the faster rotating slipping, low traction wheel so as to increase the total tractive effort of the vehicle.

2. In an automotive vehicle having a drive shaft, traction wheels and a differential connecting said drive shaft with said traction wheels, brakes cooperating with said wheels, a differential relay comprising a pair of metal discs, one coupled to each traction wheel, and a pivotally mounted magnetic core including a pair of air gaps, each gap confronting opposite surfaces of one of said discs in spaced relationship to create a magnetic drag, and brake operating means responsive to pivotal movement of said core for applying braking effort only to the slipping, low traction wheel so as to increase the total tractive effort of said vehicle.

References Cited by the Examiner

UNITED STATES PATENTS

| 2,401,628 | 6/1946 | Eksergian | 303—21 X |
| 2,790,162 | 4/1957 | McCormack | 340—268 |
| 2,884,811 | 5/1959 | Benno | 180—76 X |

FOREIGN PATENTS 7,589    1908    Great Britain.

A. HARRY LEVY, *Primary Examiner.*

WILLIAM J. KANOF, *Examiner.*